United States Patent
Lee et al.

(10) Patent No.: US 9,427,005 B2
(45) Date of Patent: Aug. 30, 2016

(54) PROCESS FOR PREPARING RICE GRUEL IN ASEPTIC PACKAGE

(75) Inventors: Chang-Yong Lee, Jeju-si (KR); Jong-Wook Kim, Seoul (KR); Sang-You Kim, Pusan (KR)

(73) Assignee: CJ CHEILJEDANG CORP., Seoul (KR)

( * ) Notice: Subject to any disclaimer, the term of this patent is extended or adjusted under 35 U.S.C. 154(b) by 1037 days.

(21) Appl. No.: 10/581,167

(22) PCT Filed: Nov. 18, 2004

(86) PCT No.: PCT/KR2004/002992
§ 371 (c)(1),
(2), (4) Date: May 31, 2006

(87) PCT Pub. No.: WO2005/053432
PCT Pub. Date: Jun. 16, 2005

(65) Prior Publication Data
US 2008/0138494 A1    Jun. 12, 2008

(30) Foreign Application Priority Data
Dec. 4, 2003    (KR) .................. 10-2003-0087760

(51) Int. Cl.
*A23L 1/182*    (2006.01)

(52) U.S. Cl.
CPC .................................... *A23L 1/182* (2013.01)

(58) Field of Classification Search
CPC ... A23L 1/182; A23L 1/1823; A23L 1/1826; A23L 1/1033
USPC ............................................. 426/618
See application file for complete search history.

(56) References Cited

U.S. PATENT DOCUMENTS

| | | | | |
|---|---|---|---|---|
| 4,892,747 A | * | 1/1990 | Ohta | 426/618 |
| 5,500,242 A | * | 3/1996 | Ishida et al. | 426/618 |
| 5,591,475 A | * | 1/1997 | Ishida | A23L 1/182 |
| | | | | 426/455 |
| 5,834,049 A | * | 11/1998 | Kageyama | 426/511 |

FOREIGN PATENT DOCUMENTS

| | | | |
|---|---|---|---|
| JP | 03198756 A | * | 8/1991 |
| JP | 403198656 | * | 8/1991 |

(Continued)

OTHER PUBLICATIONS

'Chinese Chicken and Rice Porridge', Gourmet, Feb. 2000.*

(Continued)

*Primary Examiner* — Viren Thakur
(74) *Attorney, Agent, or Firm* — Birch, Stewart, Kolasch & Birch, LLP

(57) ABSTRACT

The present invention relates to a process for preparing rice gruel in an aseptic package, whereby original soft texture and taste of grains of rice can be conserved or an extended period of time and protected from microbial contamination. The preparation process of rice gruel includes the steps of: rinsing raw ice and immersing the rice in water; putting the rice in a heat resistant plastic bowl and sterilizing at 130-150° C. for 4-8 seconds four to ten times repeatedly; adding cooking water into the bowl in an aseptic space and cooking the rice; and sealing and wrapping the bowl. By adding the cooking water at two separate times, namely before the cooking process and the wrapping process, the liquid food's unique taste and texture can be maximized.

5 Claims, 8 Drawing Sheets

(56) References Cited

FOREIGN PATENT DOCUMENTS

| JP | 05316972 A | * | 12/1993 |
| JP | 09019277 A | * | 1/1997 |
| JP | 2004283084 A | * | 10/2004 |

OTHER PUBLICATIONS

Light, 'Cook-Chill Catering', p. 107, 2000.*
Congee—Rice Gruel recipe, published 1975 "The Regional Cooking of China" by Margaret Gin and Alfred E.Castle, 101 Productions. http://www.bigoven.com/recipe/71875/congee-rice-gruel.*
Zojirushi rice cooker, Apr. 23, 2002, http://groups.google.com/group/rec.food.equipment/browse_thread/thread/d54e65c50918637/8236cb470b66e5f1?hl=en&q=Zojirushi+rice+cooker+minimum+amounts.*
GoogleGroup—Collection:Indian Vegetarian Recipes part 1, 1995 http://groups.google.com/group/rec.food.cooking/browse_thread/thread/a48d76b63077d817/a9ec5c11b37b49a3?hl=en&ie=UTF-8&q=More+Indian+Recipes+congee.*
GoogleGroups—More Indian recipes, 1996, http://groups.google.com/group/rec.food.veg.cooking/browse_thread/thread/ce9251887dd5912/aa15b8f909f89dee?hl=en&ie=UTF-8&q=More+Indian+Recipes+congee.*
Formal translation of Itakura (JP05-316972) Dec. 3, 1993.*
Brody, Aaron. "The Wiley Encyclopedia of Packaging Technology." 2nd Edition, 1997.*
Formal Translation of Matsuda JP09-019277 published 1997.*
Formal Translation of Itakura JP05-316972 published 1993.*
Formal Translation of Kato JP2004-283084 published 2004.*
Patent Abstracts of Japan, 02-053448, Feb. 22, 1990, Production of Instant Gruel or "Zosui", Hirotsugu, Masuki.
Patent Abstracts of Japan, 09-163949, Jun. 24, 1997, Instant Rice Gruel and Its Production, Lai, Qiguang.
Patent Abstracts of Japan, 60-058049, Apr. 4, 1985, Instant Gruel and Method for Producing the Same, Sadao, Koyama.
Patent Abstracts of Japan, 54-122745, Sep. 22, 1979, Production of Instant Rice Gruel, Mitsru, Kawamura.
Korean J. Food & Nutrition, Research of Kinds of Rice Porridges and Recipes of It, Lee et al., vol. 13, No. 3. 281-290 (2000).
Korean Patent Abstracts, 1019900003728 B1, May 30, 1990, Process for Preparing Retort or Canned Soup, Bon-Yol, et al.

* cited by examiner

Exp.3(Homemade gruel)

Exp.4(Retort gruel)

Exp.1-1(Gruel aseptic package)

PROCESS FOR PREPARING RICE GRUEL IN ASEPTIC PACKAGE

RELATED APPLICATIONS

This is a National Stage of International Application Number PCT/KR2004/002992, filed Nov. 18, 2004, which claims priority to Republic of Korea Application 10-2003-0087760, filed Dec. 4, 2003.

TECHNICAL FIELD

The present invention relates to a process for preparing rice gruel in an aseptic package, whereby original soft texture and taste of grains of rice can be conserved for an extended period of time and protected from microbial contamination.

BACKGROUND ART

Rice gruel is made by boiling rice in water around 100° C. for 30 minutes. It is known that $10^3 \sim 10^4$ CFU/g of microorganism lives on the surface of rice. Although the microorganism cells are usually killed during the cooking process, heat resistant spores are not completely killed. If people eat homemade or mass produced rice gruel on the spot (or at least within one day), those thermoduric microorganism would not be a serious problem. However, when mass produced rice gruel products are to be stored at room temperature for an extended period of time or distributed, the thermoduric microorganism is easily proliferated. Therefore, traditional methods for preparing rice gruel are not appropriate for the long-term storage.

Techniques for manufacturing ready-to-eat rice products in aseptic packages were introduced in Patent application Nos. 1995-0055582 and 1992-0025931, and the Patent registration No. 228509. For instance, rice was instantaneously sterilized at 135-140° C. for 40-100 seconds five to ten times, or rice was first steam heated at 80-110° C. for 15-25 minutes and added to ultraviolet sterilized deoxidized material, or rice went through a heat treatment at 100-121° C. for 20-40 minutes and was pressure cooked at 140-160° C. for 5-10 seconds twice to ten times.

However, all of the above techniques concern rice in aseptic packages, and it has not been disclosed a process for preparing rice gruel, which is much different from rice, in aseptic package.

Typically, to cook boiled (or steamed) rice, a cup of rice is boiled in 1.1-1.3 cups of water. Meanwhile, to cook rice gruel for patients or for other reasons, a cup of rice is boiled in 4-8 cups of water. Since more water is required to cook rice gruel, microorganism proliferates more easily in rice gruel, and it is very difficult to get the best taste and texture of rice because grains of rice in the rice gruel are spread greatly.

Therefore, there is a need for a simple and effective method for preserving the mild taste and texture of freshly prepared rice gruel, while protecting against microbial contamination.

Particularly, the present inventors tried to develop a process for preparing rice gruel in an aseptic package, featuring proper levels of spreadability and viscosity of grains, excellent texture and safety from microbial contamination.

DESCRIPTION OF THE DRAWINGS

The above and other objects, features and other advantages of the present invention will be more clearly understood from the following detailed description taken in conjunction with the accompanying drawings, in which.

DISCLOSURE

Technical Problem

Figure 1:
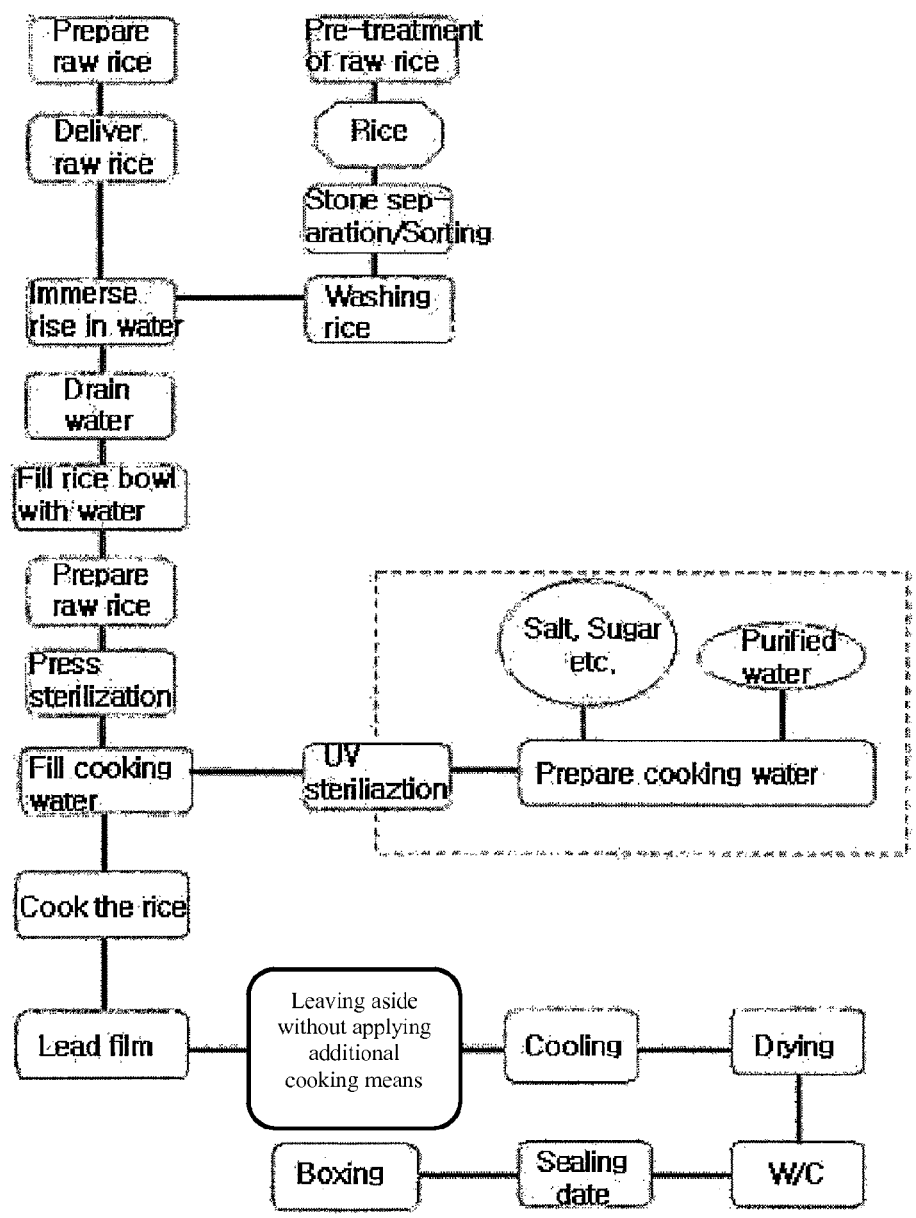
FIG. 1 is a flow chart describing a process for preparing rice gruel in an aseptic package according to the present invention.
Figure 2:
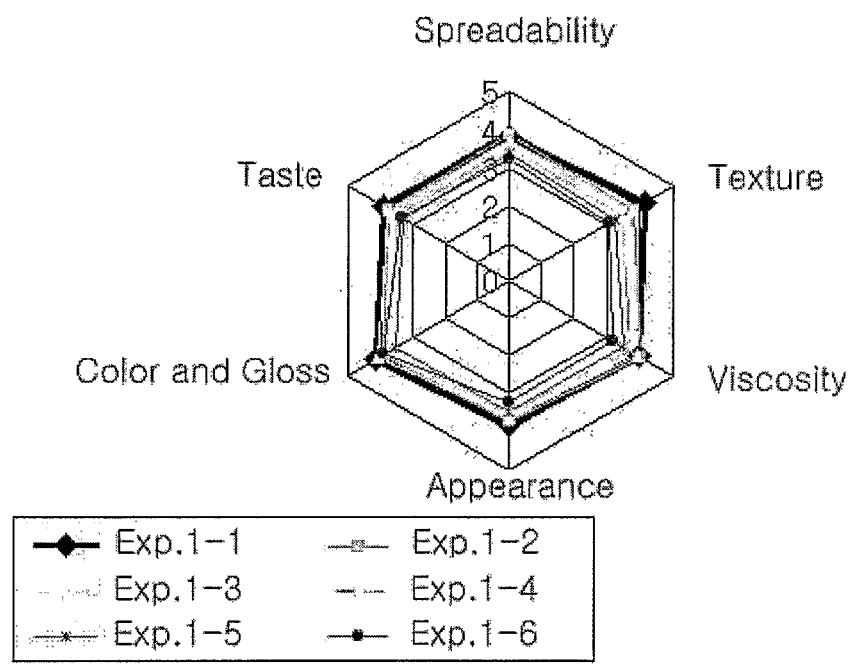
FIG. 2 illustrates an organoleptic test result of rice gruel prepared under different sterilization conditions, respectively.

Therefore, the present invention has been made in view of the above problems, and it is an object of the present invention to provide a process for preparing rice gruel in an aseptic package, whereby original soft texture and taste of grains of rice can be conserved for an extended period of time and protected from microbial contamination.

To achieve the above object and advantages, studies and experiments were done to develop a process for preparing rice gruel of excellent taste and texture in an aseptic package

Technical Solution

In accordance with an aspect of the present invention, the above and other objects can be accomplished by the provision of a process for preparing a ready-to-eat rice gruel that is easily boiled or cooked in a microwave for 1-3 minutes.

More specifically, a certain amount of rice is rinsed and immersed in water for about 1 hour. Then, the rice is put in a heat resistant plastic bowl and sterilized in an airtight place of a temperature between 130° C. and 150° C. for 4-8 seconds four to ten times repeatedly. Later, a designated amount of water for cooking the rice is added into the bowl. Finally, the rice is sealed and packed in an aseptic space. This rice product can be conserved at room temperature for at least six months, and is perfectly safe from microbial contamination.

The rice gruel prepared according to the present invention not only has excellent taste and texture but also can be conserved for a long period of time because it is safe from microbial contamination.

The process for preparing rice gruel includes the steps of: rinsing rice; immerse the rinsed rice in water for a predetermined amount of time; sterilizing the rice under high pressure and temperature; supplying a predetermined amount of cooking water and steaming; and wrapping the rice product with a lead film in a Clean room.

In a different method of the technique, 30-70 wt % of cooking water is first added prior to the cooking process, and the residual amount of the cooking water is added before the wrapping.

Rice is rinsed in purified water to remove starch-bearing material and other impurities on the surface of grains, and immerse the rice in water for about one hour.

After removing water on the rice, a predetermined amount of the rice is put in a heat resistant plastic bowl. Then, the bowl filled with the rice is sterilized at a temperature higher than 140° C. for 4.5 seconds eight times to kill any microorganisms that might live in the rice. The sterilization condition should not be extremely strict because the grains of rice could be spread more than expected.

Later, a predetermined amount of water is poured into the bowl for cooking the sterilized rice. The rice in water is then cooked or steamed at 100° C. for 40 minutes. During the cooking process, starch of the rice is eluted into the cooking water, giving the water the rice gruel's typical viscosity. Depending on which kind of rice gruel (liquid food) is to be prepared, the cooking water can be added two separate times such as before the cooking process and before the packing process.

Once the cooking process is complete, the rice bowl is sealed with a lead film in a Clean room (Class 100 or below certified clean room, 100 particles of 0.5 µm in 1 ft$^3$) by NASA-Developed Technology, and manufactured as a rice product after going through the cooking, cooling and drying processes.

Thusly manufactured rice product can be conserved at room temperature for at least six months.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Advantageous Effects

The rice gruel in an aseptic package according to the present invention features soft mouthfeel and excellent taste and texture, and it is safe from microbial contamination and can be conserved for an extended period of time. Although the rice gruel is mass produced, it provides the same quality as the homemade rice gruel with no significant differences. Because of the pleasing appearance and mild taste of the rice gruel, its popularity and commercial value in the ready-to-eat food industry will rise.

Mode for Invention

Example 1

Preparation of Rice Gruel Under High-Temperature Steam Sterilization Conditions (1) Sterilization for 4.5 Seconds at 140-143° C., Repeated 7 Times 10,000 g of raw rice was rinsed five times in water, immersed in water for 1 hour, and placed in a meshed ladle to drain the water. Then, 44 g of the rice was put in a heat resistant bowl. The bowl with the rice was placed in a high-temperature pressure sterilizer (manufactured by Shinwa Co.) and sealed. In result, the bowl was sterilized by high pressure steam of 140-143° C. for 4.5 seconds. This sterilization process was carried out seven times repeatedly.

After the high temperature steam sterilization, the bowl was filled with 226 g of cooking water. The steam temperature of a rice cooking unit was set at 100° C., and the rice in the water was cooked for 40 minutes to prepare rice gruel. When the cooking process is over, the bowl was sealed with a lead film in an aseptic space and left aside for approximately 12 minutes for further cooking. Finally, the bowl was cooled in a 10° C. water bath for 15 minutes.

(2) Sterilization for 4.5 Seconds at 148-150° C., Repeated 7 Times 10,000 g of raw rice was rinsed five times in water, immersed in water for 1 hour, and placed in a meshed ladle to drain the water. Then, 44 g of the rice was put in a heat resistant bowl. The bowl with the rice was placed in a high-temperature pressure sterilizer (manufactured by Shinwa Co.) and sealed. In result, the bowl was sterilized by high pressure steam of 148-150° C. for 4.5 seconds. This sterilization process was carried out seven times repeatedly.

After the high temperature steam sterilization, the bowl was filled with 226 g of cooking water. The steam temperature of a rice cooking unit was set at 100° C., and the rice in the water was cooked for 30 minutes to prepare rice gruel. When the cooking process is over, the bowl was sealed with a lead film in an aseptic space and left aside for approximately 12 minutes for further cooking. Finally, the bowl was cooled in a 10° C. water bath for 15 minutes.

(3) Sterilization for 6 Seconds at 140-143° C., Repeated 7 Times 10,000 g of raw rice was rinsed five times in water, immersed in water for 1 hour, and placed in a meshed ladle to drain the water. Then, 44 g of the rice was put in a heat resistant bowl. The bowl with the rice was placed in a high-temperature pressure sterilizer (manufactured by Shinwa Co.) and sealed. In result, the bowl was sterilized by high pressure steam of 140-143° C. for 6 seconds. This sterilization process was carried out seven times repeatedly.

After the high temperature steam sterilization, the bowl was filled with 226 g of cooking water. The steam temperature of a rice cooking unit was set at 100° C., and the rice in the water was cooked for 50 minutes to prepare rice gruel. When the cooking process is over, the bowl was sealed with a lead film in an aseptic space and left aside for approximately 12 minutes for further cooking. Finally, the bowl was cooled in a 10° C. water bath for 12 minutes.

(4) Sterilization for 6 Seconds at 148-150° C., Repeated 7 Times 10,000 g of raw rice was rinsed five times in water, immersed in water for 1 hour, and placed in a meshed ladle to drain the water. Then, 44 g of the rice was put in a heat resistant bowl. The bowl with the rice was placed in a high-temperature pressure sterilizer (manufactured by Shinwa Co.) and sealed. In result, the bowl was sterilized by high pressure steam of 148-150° C. for 6 seconds. This sterilization process was carried out seven times repeatedly.

After the high temperature steam sterilization, the bowl was filled with 226 g of cooking water. The steam temperature of a rice cooking unit was set at 100° C., and the rice in the water was cooked for 40 minutes to prepare rice gruel. When the cooking process is over, the bowl was sealed with a lead film in an aseptic space and left aside for approximately 12 minutes for further cooking. Finally, the bowl was cooled in a 10° C. water bath for 15 minutes.

(5) Sterilization for 6 Seconds at 145-150° C., Repeated 10 Times 10,000 g of raw rice was rinsed five times in water, immersed in water for 1 hour, and placed in a meshed ladle to drain the water. Then, 44 g of the rice was put in a heat resistant bowl. The bowl with the rice was placed in a high-temperature pressure sterilizer (manufactured by Shinwa Co.) and sealed. In result, the bowl was sterilized by high pressure steam of 145-150° C. for 6 seconds. This sterilization process was carried out ten times repeatedly.

After the high temperature steam sterilization, the bowl was filled with 226 g of cooking water. The steam temperature of a rice cooking unit was set at 100° C., and the rice in the water was cooked for 40 minutes to prepare rice gruel. When the cooking process is over, the bowl was sealed with a lead film in an aseptic space and left aside for approximately 12 minutes for further cooking. Finally, the bowl was cooled in a 10° C. water bath for 15 minutes.

(6) In the Absence of High Temperature Steam Sterilization 10,000 g of raw rice was rinsed five times in water, immersed in water for 1 hour, and placed in a meshed ladle to drain the water. Then, 42 g of the rice was put in a heat resistant bowl and 231 g of cooking water was poured into the bowl. The steam temperature of a rice cooking unit was set at 100° C., and the rice in the water was cooked for 40 minutes to prepare rice gruel. When the cooking process is over, the bowl was sealed with a lead film in an aseptic space and left aside for approximately 12 minutes for further cooking. Finally, the bowl was cooled in a 10° C. water bath for 15 minutes.

Example 2

Preparation of Rice Gruel Under Different Methods of Filling Cooking Water (1) Adding 113 g of Water Prior to Cooking and Wrapping 10,000 g of raw rice was rinsed five times in water, immersed in water for 1 hour, and placed in a meshed ladle to drain the water. Then, 44 g of the rice was put in a heat resistant bowl. The bowl with the rice was placed in a high-temperature pressure sterilizer (manufactured by Shinwa Co.) and sealed. In result, the bowl was sterilized by high pressure steam of 140-143° C. for 4.5 seconds. This sterilization process was carried out seven times repeatedly.

After the high temperature steam sterilization, 113 g of cooking water was added into the bowl. The steam temperature of a rice cooking unit was set at 100° C., and the rice in the water was cooked for 40 minutes to prepare rice gruel. When the cooking process is over, 113 g of cooking water was added again into the bowl. Later, the bowl was sealed with a lead film in an aseptic space and left aside for approximately 12 minutes for further cooking. Finally, the bowl was cooled in a 10° C. water bath for 15 minutes.

(2) Adding 75 g of Water Prior to Cooking and 151 g Prior to Wrapping 10,000 g of raw rice was rinsed five times in water, immersed in water for 1 hour, and placed in a meshed ladle to drain the water. Then, 44 g of the rice was put in a heat resistant bowl. The bowl with the rice was placed in a high-temperature pressure sterilizer (manufactured by Shinwa Co.) and sealed. In result, the bowl was sterilized by high pressure steam of 140-143° C. for 4.5 seconds. This sterilization process was carried out seven times repeatedly.

After the high temperature steam sterilization, 75 g of cooking water was added into the bowl. The steam temperature of a rice cooking unit was set at 100° C., and the rice in the water was cooked for 40 minutes to prepare rice gruel. When the cooking process is over, 151 g of cooking water was added again into the bowl. Later, the bowl was sealed with a lead film in an aseptic space and left aside for approximately 12 minutes for further cooking. Finally, the bowl was cooled in a 10° C. water bath for 15 minutes.

(3) Adding 151 g of Water Prior to Cooking and 75 g Prior to Wrapping 10,000 g of raw rice was rinsed five times in water, immersed in water for 1 hour, and placed in a meshed ladle to drain the water. Then, 44 g of the rice was put in a heat resistant bowl. The bowl with the rice was placed in a high-temperature pressure sterilizer (manufactured by Shinwa Co.) and sealed. In result, the bowl was sterilized by high pressure steam of 140-143° C. for 4.5 seconds. This sterilization process was carried out seven times repeatedly.

After the high temperature steam sterilization, 151 g of cooking water was added into the bowl. The steam temperature of a rice cooking unit was set at 100° C., and the rice in the water was cooked for 40 minutes to prepare rice gruel. When the cooking process is over, 75 g of cooking water was added again into the bowl. Later, the bowl was sealed with a lead film in an aseptic space and left aside for approximately 12 minutes for further cooking. Finally, the bowl was cooled in a 10° C. water bath for 15 minutes.

Example 3

Preparation of Homemade Rice Gruel 200 g of raw rice was rinsed five times in water and immersed in water for 1 hour. After draining the water, the rice was added with 1200 g of water and boiled in a pot. The pot was put on medium high heat and when the water boils and starts bubbling, the heat was turned down as low as possible until the grains are sufficiently spread for rice gruel.

Example 4

Preparation of Retort Gruel 200 g of raw rice was rinsed five times in water and immersed in water for 1 hour. After draining the water, the rice was added with 1200 g of water in a pouch and retorted.

Experimental Example 1

Influence of Sterilization Conditions on Physical Properties of Gruel

Rice gruel was prepared under different sterilization conditions as described in Example 1, and 30 people were invited to evaluate the quality of each rice gruel as part of the organoleptic test. In the organoleptic test, the rice gruel was evaluated in terms of spreadability of grains, texture, viscosity, appearance, color and gloss, and taste. For the test, a five-point rating system was adopted (i.e., 5: excellent, 4: very good, 3: average, 2: inferior, and 1: very inferior). The evaluation result is shown in the following Table 1.

TABLE 1

Organoleptic test result

|  | Spread-ability | Texture | Viscosity | Appearance | Color and Gloss | Taste |
|---|---|---|---|---|---|---|
| Ex. 1-1 | 3.8 | 3.91 | 3.94 | 3.8 | 4.12 | 3.82 |
| Ex. 1-2 | 3.84 | 3.75 | 4.02 | 3.75 | 4.02 | 3.69 |
| Ex. 1-3 | 3.72 | 3.7 | 3.9 | 3.9 | 4.05 | 3.9 |
| Ex. 1-4 | 3.5 | 3.43 | 3.65 | 3.5 | 3.76 | 3.4 |
| Ex. 1-5 | 3.35 | 3.21 | 3.47 | 3.46 | 3.53 | 3.27 |
| Ex. 1-6 | 3.2 | 3.02 | 3.11 | 3.21 | 3.84 | 3.31 |
| P-value | **0.019 | **0.027 | **0.034 | **0.043 | **0.047 | **0.013 |

**CI 95% of significant difference

Figure 3:
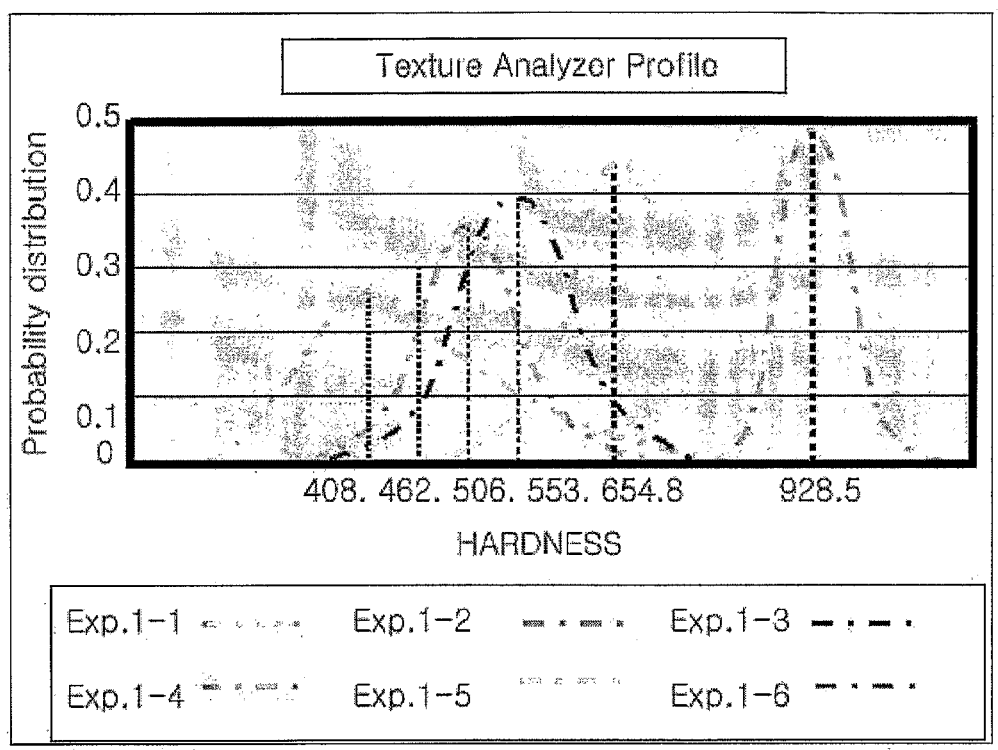
FIG. 3 illustrates a texture analyzer profile of rice gruel prepared under different sterilization conditions, respectively.
Figure 4:
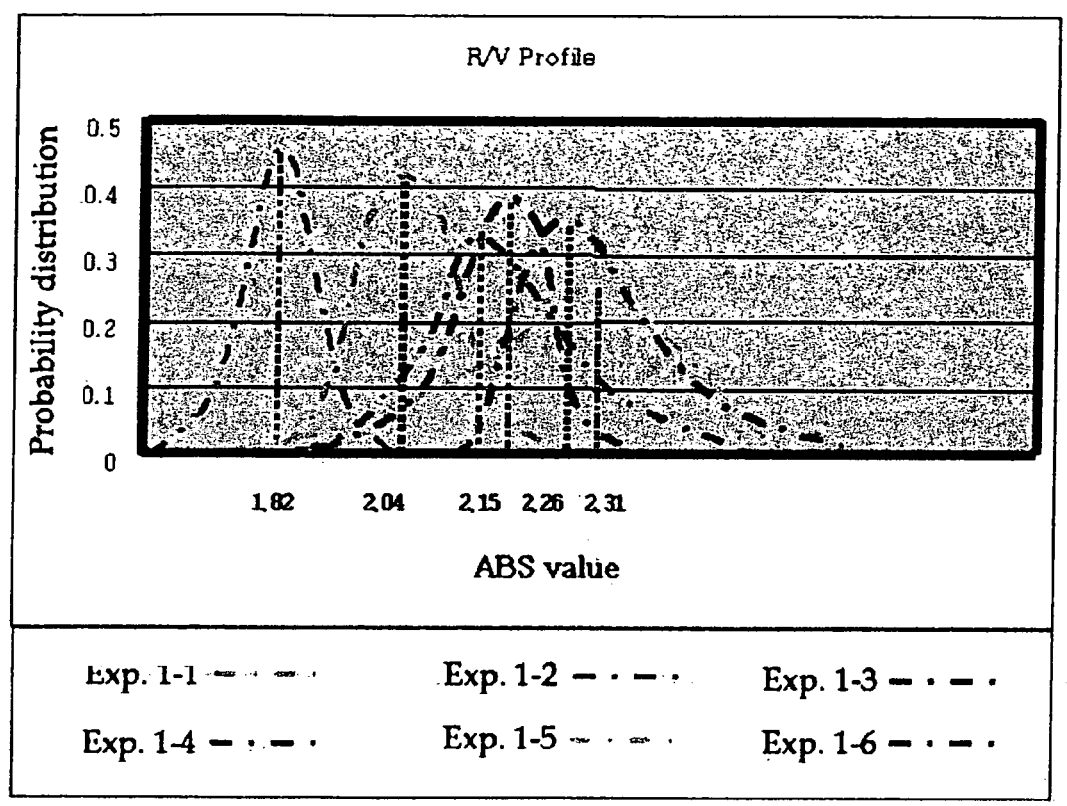
FIG. 4 illustrates an R/V profile of rice gruel prepared under different sterilization conditions, respectively.

Texture analyzer profile of rice gruel in Examples 1-1 to 1-6 are illustrated in FIG. 3, and R/V profile in FIG. 4.

The following conclusions can be derived from the evaluation.

Example 1-1 obtained the highest points in the organoleptic test and texture analyzer profile. Example 1-2 showed relatively lower texture and color & gloss than Example 1-1 because of the increase in sterilization temperature. Example 103 showed the same qualities as Example 1-2 when the sterilization time was extended. From these observations, it can be concluded that the texture of grains of rice is softened by intensifying the effects of sterilization. The same conclusion can also be derived from the results of texture analyzer profile and RV profile. Similarly, Examples 1-4 and 1-5 exhibit such facts.

In other words, the texture of grains of rice is inversely proportional to the amount of starch eluded from the rice. Also, it is found out that the intensified sterilization process has a negative effect on the color and gloss. If the high temperature steam sterilization is not performed and only the cooking process was done as in Example 1-6, the rice grains were hardened, far from the desired soft rice gruel. Example 1-1 has a proper degree of texture for rice gruel because the rice was already gelatinized somewhat during the high temperature steam sterilization, and steamed again, eluding starch more easily than the steam cooking.

Therefore, the optimal conditions for preparing microbial contamination-free rice gruel with excellent taste and texture can be established from the evaluation results. That is, the sterilization effects were maximized at 130-150° C. for 4-8 seconds four to ten times repeatedly. If the sterilization temperature is lower than 130° C. some of microorganism can still survive. Meanwhile, if the sterilization temperature is higher than 150° C., the rice is not soft in texture any more.

Experimental Example 2

Influence of Cooking Water Filling Methods on Physical Properties of Gruel

Figure 5:
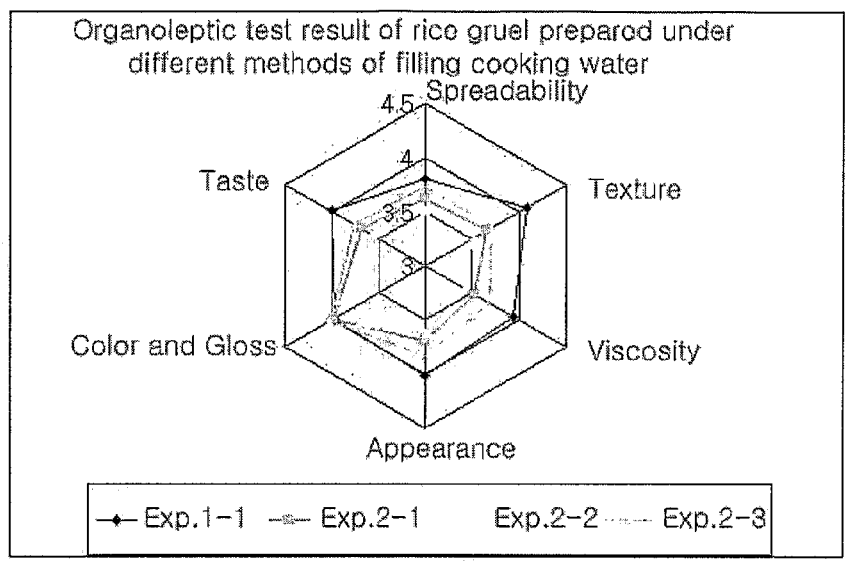
FIG. 5 illustrates an organoleptic test result of rice gruel prepared different methods of filling cooking water, respectively.

Rice gruel was prepared under different methods of filling cooking water as described in Example 1-1 and Examples 2-1, 2-2, and 2-3, and 30 people were invited to evaluate the quality of each rice gruel as part of the organoleptic test. FIG. 5 illustrates an organoleptic test result of rice gruel prepared different methods of filling cooking water, respectively.

Figure 6:
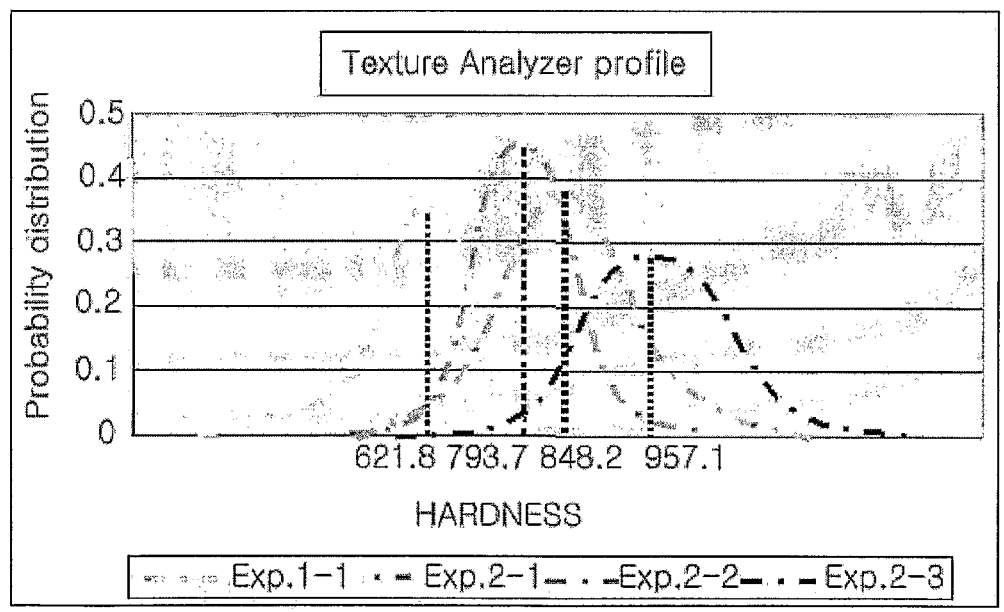
FIG. 6 illustrates a texture analyzer profile of rice gruel prepared different methods of filling cooking water, respectively.
Figure 7:
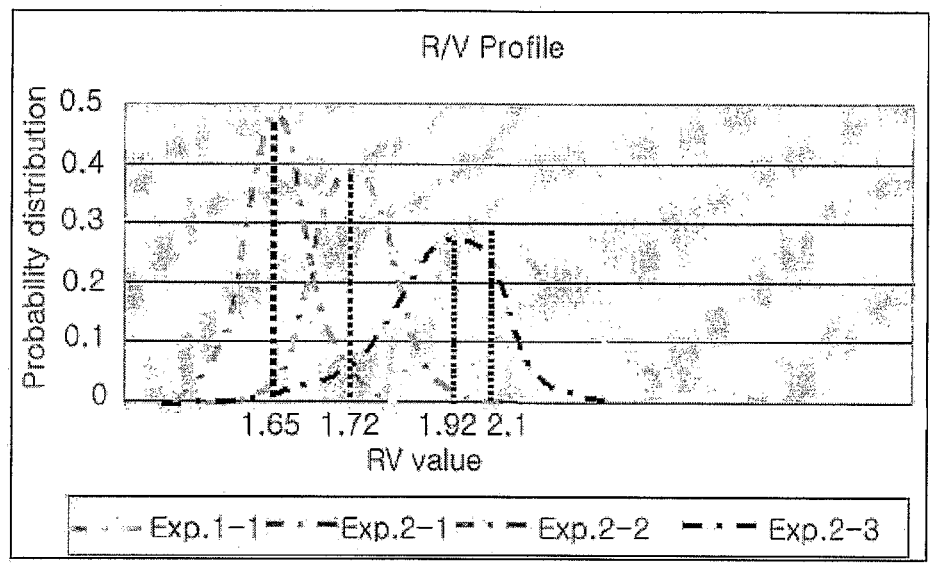
FIG. 7 illustrates an R/V profile of rice gruel prepared under different methods of filling cooking water, respectively.

FIG. 6 illustrates a texture analyzer profile of Example 1-1 and Examples 2-1, 2-2, and 2-3, respectively; and FIG. 7 illustrates an R/V profile thereof.

Based on the organoleptic result, one can conclude that Example 1-1 is superior to Example 2. However, if the texture of rice grains needs to be harder the cooking water should be added two separate times, i.e., prior to the cooking process and the wrapping process, as described in Example 2. For example, the preparation process of Example 2 is the best choice for preparing a liquid food with minimum spreadability of rice grains (e.g., risotto).

In addition, if a greater amount of cooking water is added prior to the cooking process as in Examples 2-1, 2-2 and 2-3, the texture of grains is softer. This is because the starch is more easily and effectively eluded by the application of heat during the cooking process and in the present of much water. Thus, the amount of cooking water before/after the cooking process can be used as the control point of the mass production of rice gruel.

Experimental Example 3

Influence of Preparation Processes of Gruel on Physical Properties of Gruel

Figure 8:
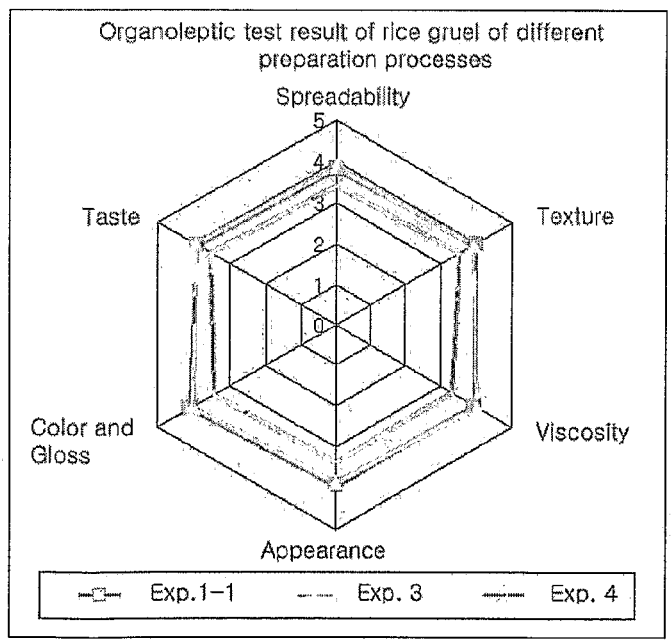
FIG. 8 illustrates an organoleptic test result of rice gruel of different preparation processes, respectively.

Rice gruel was prepared under different preparation processes of gruel as described in Example 1-1 and Examples 3 and 4, and 30 people were invited to evaluate the quality of each rice gruel as part of the organoleptic test. FIG. 8 illustrates an organoleptic test result of rice gruel of Example 1-1 and Examples 3 and 4, respectively.

Figure 9:
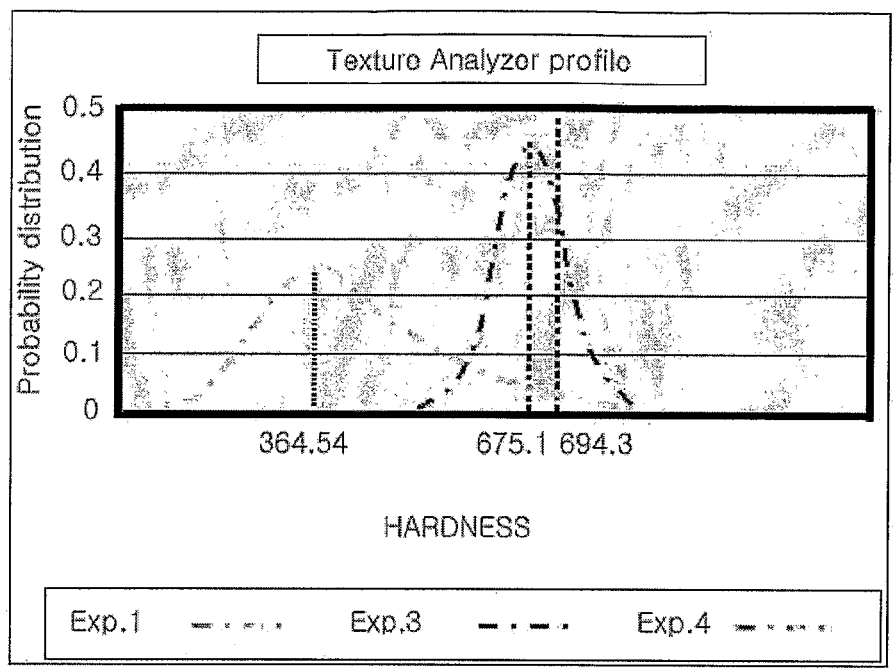
FIG. 9 illustrates a texture analyzer profile of rice gruel of different preparation processes, respectively.
Figure 10:
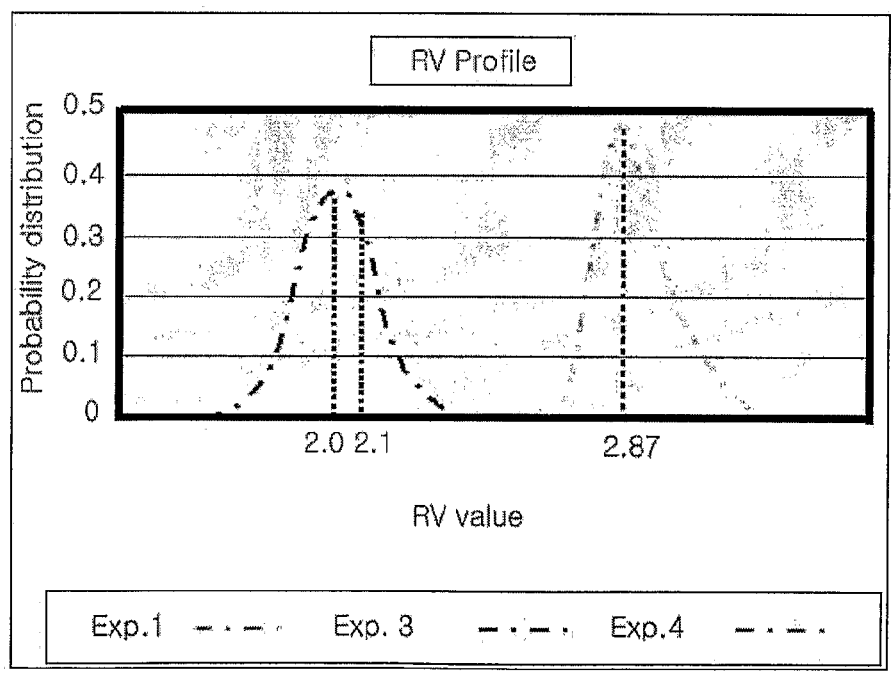
FIG. 10 illustrates an R/V profile of rice gruel of different preparation processes, respectively.
Figure 11:
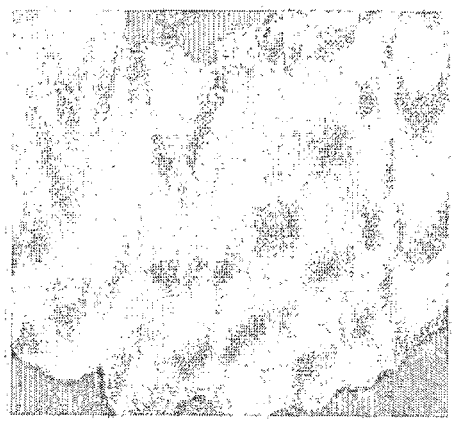
FIG. 11 is picture illustrating different spreadabilities of grains in rice gruel of different preparation processes.
Figure 11:
Figure 11:
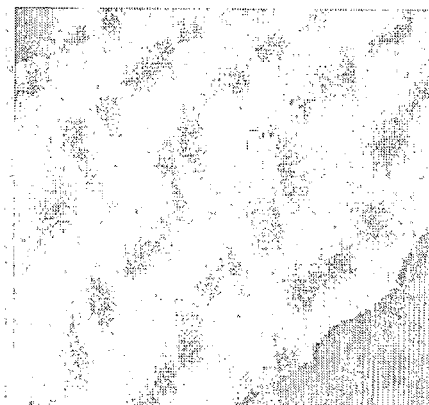

FIG. 9 illustrates a texture analyzer profile of Example 1-1 and Examples 3 and 4 respectively; and FIG. 10 illustrates an R/V profile thereof.

As shown in the drawings, Example 1-1 exhibited similar product qualities with Example 3 in terms of the spreadability, viscosity and texture. However, the texture of grains in Example 4 was severely ruined by retort sterilization and thus, the rice grains were overcooked. In result, starch was eluded much more than desired, which has an adverse effect on the organoleptic overall.

The invention claimed is:

1. A process for preparing rice gruel in an aseptic package, consisting essentially of the steps of:
   rinsing raw rice;
   immersing the rice in water;
   removing the water from the rice;
   and then putting the rice into a heat resistant plastic bowl in an aseptic space and sterilizing at 140-143° C. for 4.5 seconds with high pressure steam, seven times repeatedly;
   adding 50-70 wt % of total cooking water into the bowl in a first adding step and cooking the rice by steaming with 100° C. steam;
   adding the residual amount of the total cooking water into the bowl;
   sealing and wrapping the bowl in the aseptic space; and
   leaving aside the bowl for 12 minutes and then cooling the bowl in a 10° C. water bath for 15 minutes.

2. The process of claim 1, wherein the cooking water added in the first adding step is 67-70 wt % of the total cooking water.

3. A process for preparing rice gruel in an aseptic package, comprising the steps of:
   rinsing raw rice;
   immersing the rice in water;
   removing the water from the rice;

and then putting the rice into a heat resistant plastic bowl in an aseptic space and sterilizing at 130-150° C. for 4-8 seconds with high pressure steam, four to ten times repeatedly;

adding 50-70 wt % of total cooking water into the bowl in a first adding step and cooking the rice by steaming with 100° C. steam;

adding the residual amount of the total cooking water into the bowl; and sealing and wrapping the bowl in the aseptic space.

4. The process of claim 3, further comprising:

leaving aside the bowl for approximately 12 minutes and then cooling the bowl in a 10° C. water bath for 15 minutes.

5. The process of claim 3, wherein the cooking water added in the first adding step is 67-70 wt % of the total cooking water.

* * * * *